(12) United States Patent
Randle et al.

(10) Patent No.: US 7,565,326 B2
(45) Date of Patent: Jul. 21, 2009

(54) DIALECT INDEPENDENT MULTI-DIMENSIONAL INTEGRATOR USING A NORMALIZED LANGUAGE PLATFORM AND SECURE CONTROLLED ACCESS

(76) Inventors: William M. Randle, 2361 Morse Rd., Columbus, OH (US) 43229; Randall E. Orkis, 2361 Morse Rd., Columbus, OH (US) 43229

( * ) Notice: Subject to any disclaimer, the term of this patent is extended or adjusted under 35 U.S.C. 154(b) by 1341 days.

(21) Appl. No.: 10/283,038

(22) Filed: Oct. 25, 2002

(65) Prior Publication Data

US 2003/0200172 A1 Oct. 23, 2003

Related U.S. Application Data

(63) Continuation-in-part of application No. 09/578,329, filed on May 25, 2000, now abandoned.

(51) Int. Cl.
*G06F 17/60* (2006.01)
(52) U.S. Cl. .......................................... 705/65; 705/39
(58) Field of Classification Search .................. 705/65, 705/39
See application file for complete search history.

(56) References Cited

U.S. PATENT DOCUMENTS

2004/0083174 A1* 4/2004 Silverbrook et al. .......... 705/42

FOREIGN PATENT DOCUMENTS

JP 411275069 A * 10/1999

* cited by examiner

*Primary Examiner*—Pierre E Elisca
(74) *Attorney, Agent, or Firm*—Edwin M. Baranowski; Porter Wright Morris & Arthur LLP (57) ABSTRACT

A system and method of aggregating and integrating authentication and/or authorization protocols of a user or a user's information across a wide range of related or nonrelated channels and exchange services. An interface is provided that allows multi-credential, multi-service, multi-role, and multi-channel based routing to multiple authorization and authentication providers in a secure system. Using a standardized language, the system creates a framework to enable entities to communicate and perform transactions instantly or nearly instantly, and seamlessly. The systems supports trusted and untrusted connections as well as multiple levels of encryption.

16 Claims, 10 Drawing Sheets

```xml
<?xml version="1.0" ?>
<IFX xmlns:com.ebancllc="http://www.ebancllc.com">
  <SignonRq>
    <com.ebancllc:SignonPswdInit>
      <SignonRole>Customer</SignonRole>
      <CustId>
        <SPName>Empowered National Bank</SPName>
        <CustLoginId>292-84-0947</CustLoginId>
      </CustId>
      <CustPswd>
        <CryptType>None</CryptType>
        <Pswd>1234</Pswd>
      </CustPswd>
      <GenSessKey>1</GenSessKey>
    </com.ebancllc:SignonPswdInit>
    <ClientDt>20010220152355738</ClientDt>
    <CustLangPref>EN-US</CustLangPref>
    <ClientApp>
      <Org>Corillian</Org>
      <Name>Voyager</Name>
      <Version>1.0</Version>
    </ClientApp>
  </SignonRq>
  <BaseSvcRq>
    <CustIdInqRq>
      <CustLoginId>292-84-0947</CustLoginId>
    </CustIdInqRq>
  </BaseSvcRq>
</IFX>
```

DIALECT INDEPENDENT MULTI-DIMENSIONAL INTEGRATOR USING A NORMALIZED LANGUAGE PLATFORM AND SECURE CONTROLLED ACCESS

CROSS-REFERENCE TO RELATED APPLICATIONS

This application is a continuation in part of co-pending application Ser. No. 09/578,329, Secure E-Commerce System with Guaranteed Funds and Net Settlement filed on May 25, 2000 now abandoned.

FIELD OF THE INVENTION

The present invention relates to secure electronic information transfer and exchange between and among institutions and/or systems. In particular, the present invention relates to a system for integrating authentication and/or authorization activities and protocols across a wide range of channels, devices, and exchange services.

BACKGROUND OF THE INVENTION

Electronic information exchange methods are a standard means for the transfer of information. Electronic transfer methods, such as Electronic Data Interchange (EDI), computer readable media, e-mail, World Wide Web (WWW), File Transfer Protocol (FTP), Internet Relay Chat (IRC), and the like, may be accessed in a variety of methods and means, including wired as well as wireless access. The transfer of information electronically creates the potential for unauthorized eavesdropping or unauthorized access on the exchange. To protect information and prevent unauthorized access and use of information, most providers employ security procedures for authentication and/or authorization. Security procedures may be in the form of a sign-on protocol that requires a user name and password or other digital security object prior to the exchange of information. Information protected by authentication and authorization protocols may further include encryption to deter unauthorized access and use and provide for the secure communication of information.

The present invention relates to an enterprise business integration engine having secure access adapted preferably to uses in the financial industry in areas such as relationship management, merger and acquisition integration, operational risk management and performance management. The invention overcomes problems in the prior art associated with market change, competition, consumer preferences, regulatory changes and disjointed information architecture in legacy systems.

The financial industry offers a broad range of electronic applications for financial services over a broad range of networks, channels and devices. Corporate entities use electronic transfer mechanisms for cash management, funds transfers, and balance reporting over multiple company accounts; personal users perform electronic financial inquiries and transfers such as banking on the Internet, ATM use, smart card transaction, electronic fund transfers (EFTs), and the like. Obviously, the need for security in the transfer of financial information is paramount.

To maintain security and data integrity, providers of financial information and exchanges have devised authentication and/or authorization protocols in environments solely for that provider's system or for a limited group of providers or services. Each protocol independently determines who the user is and/or whether a user may use a particular service, which objects among the range of channels and exchange services the user is allowed to access. No prior system offers users within that system a comprehensive solution to access and exchange secure information to and from disparate and/or unrelated sources.

Security in the exchange of financial information also impedes interaction between legacy and new systems. In order to insure the secure delivery of services, providers of financial information and exchange services require users to complete new identification information so that a user must use separate access protocols in order to use a new version of a given existing application.

The multitude of incompatible authentication and authorization protocols mandates that consumers of electronic financial services perform numerous sign-on procedures. Each authentication and/or authorization procedure service requires the retention of separate passwords or other digital security objects. As a result, the electronic exchange of financial information requires authorization and/or authentication to multiple security systems producing incompatibilities and delays in financial exchanges between and among institutions, merchants, and their customers and clients.

Security protocols also include varying levels of access and authorization for a user of electronic financial information and exchanges. Existing systems are not integrated, and actually work to prevent integration of access and authorization across systems by employing credentialing or identification mechanisms that are specific only to that system. The specific mechanisms require protocols that reflect various system-specific policy rules and activities that may not be compatible with other systems or technologies.

In the prior art, a lack of enterprise application architecture scatters data and business logic. For example, data files relating to relationship (customer to ... household, organizations, other customers, etc.), demographics (income, marriage status, address(s), geo codes, preferences, etc.), accounts (product types, rates, balances, status, etc.), transactions (amount, time, location, volume, etc.), behavior (contacts, requests, issues, campaign, events/triggers, etc.), history (financial and nonfinancial trends), and analysis (profitability, best offers, risk factors, etc.) are often scattered and inaccessible from one legacy system to another.

Complicated and expensive connectivity systems have been proposed to resolve these issues; however, prior solutions have a negative impact on key business initiatives such as relationship management, merger and acquisition integration, performance management, and operational risk management. Prior art deployment stratagems for an information integration hub have been elusive. To build is expensive and risky, involving projected costs of $50 Million to $75 Million and a projected timeframe of from 24 to 36 months before value is achieved. High risk and high cost are associated with lack of experience and resource constraints and existing channel software or middleware may present a high risk to stretch a product past design. Namely there are too many pieces to try to put together. Hence, the scope and risk of an integration project has hindered attempts at solving the data integration problem in the financial industry and there are numerous universal adapters for core systems and delivery channels which have proven unsatisfactory.

Channels perform authentication either at the channel (using a trusted connection to other systems) or use an external or host-based (untrusted connection to the device or system that is providing authentication, and/or authorization) security. The disparity of trusted or untrusted systems among channels, devices, and services severely limits a uniform system for secure transactions. As an example, an ATM usually uses a trusted security pathway, in that ATM's compare a user's credentials to information stored on the ATM's system.

If systems are to be integrated, trusted and untrusted channels have a need to proxy security to another entity. This may be required when credentials are presented and must be checked prior to allowing a user to access information across disparate systems. Channels may also provide a reference to a session or activity context that can be tied to the credential(s) presented by a device, system, person or channel. In order for a channel to perform exchanges between individual services, such as a web banking application that includes ATM access and a smart card, the individual authorization and authentication protocols for each of those services require a user to submit multiple user IDs and passwords in order to perform inquiries and transfers among and between services and/or systems.

A need exists for a system that integrates authentication and/or authorization protocols and various encryption schemes required for independent services that determines a device, person, channel or system's relationship to a given service, the objects among the channels and exchange options allowed, and the level of access allowed for each device, person, channel, system, service, and exchange. An integrated security solution that provides a flexible service is desirable to save time and resources. No existing system in the prior art adapts easily for use with all services, devices, and delivery channels with multiple credential storage systems or encryption schemes.

BRIEF SUMMARY OF THE INVENTION

The present invention provides for the integration of authorization and/or authentication protocols across entities, channels, devices, for both new and legacy systems while supporting encrypted and unencrypted connections and interfaces. The present invention aggregates and consolidates multiple security systems and credential storage approaches into a seamless system from the user, device and interface perspective. The present invention provides a security integrator capable of aggregating and consolidating authentication and/or authorization protocols performed by multiple related or indirectly related channels and systems. Use of the invention allows existing systems to be leveraged with other systems as needed by providing a single service and management system for use in multiple disparate security systems.

The present invention provides the ability to integrate authentication and/or authorization protocols and various levels of encryption required in response to any given request associated with related or nonrelated services, devices, and channels. The present invention provides a universal and logical exchange of information concerning authentication and/or authorization with little impact on the transaction, information, channel or service. The present invention provides for efficiency in the elimination of repeated user sign-ons for authentication and/or authorization and the need for an individual or system specific service for each new and legacy credential or credential management scheme.

Any normalized language may be used to perform the functions of the present invention. In the preferred embodiment, Extensible Markup Language (XML) is used to deliver a message containing a request for authentication and/or authorization. The preferred embodiment uses XML constructs to associate session context with a particular channel to a session key linked to a user and the context of services and/or information requested by the user, or an object associated with a session exchange between parties desired to be identified during a particular session.

The invention integrates authentication and authorization in multiple varieties of transactions, identification protocols, and exchanges. The preferred embodiment of the invention is directed to electronic financial information exchanges, such as payments, debits, credits, account reconciliation services and the like. The preferred embodiment is applicable to Electronic Bill Presentment and Payment, Business to Business Payments, Business to Business Banking (such as balance and transaction reporting, remittance information), automated teller machine communications, Consumer to Business Payments, Consumer to Business Banking, wireless transactions, consumer to consumer transactions, and the like.

It is thus an object of the invention to fill a long felt need in the financial industry for an information integration hub and to provide enterprise-wide comprehensive customer information and interaction capabilities for all delivery channels in a unified and centralized process, with business rules and data specific to financial services. The system addresses the unique needs of financial services institutions, is standards based, open for ease of integration and operation, agile and flexible, quick to implement to realize business goals, scalable, and allows high transaction throughput required by an enterprise-class, mission critical solution. The system is reliable and secure, provides accurate and auditable customer financial transaction processing, and the system integration provided is nonintrusive and minimizes impacts on existing systems. Deployment may be incremental and in manageable phases.

In an embodiment, the system is useful with an adapter that enables universal access to the enterprise aggregator hub and is noninvasive to existing systems. An object processor, which is a document processor, handles IFX sign on processing, creates and maintains session context, role and rules-based authorization, decomposes XML documents into messages and invokes appropriate message processors for each message in the document. Message processors send and receive business management routine (BMR) requests and compose response messages and processors assemble response messages into completed XML response documents. The object is transported and a service provider routes requests internally and externally. A comprehensive system management process results allowing a complete audit trail of all interactions, comprehensive balance and controls, configurable settings, SNMP support, comprehensive monitoring capability, and regulatory compliance and reporting.

The system facilitates the access and distribution of information across an enterprise (or multiple disparate networks) and enables integration of all current systems through a noninvasive adapter. A schema-based document processor supports XML semantic representations such as IFX and EBXML and provides location independent communication between components (location transparency). Enterprise logging ensures that application metrics, errors, audit, and trace information are reliably available. The system, a logical model of enterprise information aggregation, is a foundation for reuse and business value and a key component for providing consistent information to all channels.

An information aggregator is provided in which identification, authorization and authentication information is related to multiple credentials in potentially different formats or dialects allowing access to information or transactions dependent on the user, the device used at an access point, the request made or activity involved, and the service provider. A multitude of credentials can be established for numerous activities and users. For example, in an authentication process at an ATM, a user inserts a card and enters a PIN comprising the data transmitted in the ATM network to the integrator. The card and PIN data validate the user as registered in the hub system or through a look up in another system, as registered therein. Hence, the authorization may be internal or external. Once validated, a permitted activity is available to the verified user dependent upon criteria associated with the identity and device (authorization) and the activity is then executed by a service provider through the hub. An on-line capability for on-line transactions to be effected, analogous to a paper check system, is achieved.

A log on protocol is provided that eliminates the one to one look up correlation associated with prior art systems. Based upon the user, the identity security (PIN, password, biometric, etc.) and the device (public ATM, home personal computer, enterprise terminal, telephone, PDA, cell phone, remote log on, etc.) and location (headquarters, branch office, remote, etc.), the services and activities available to a user can be determined from a factorial range of alternatives determinant of an authenticated user's authority to participate in a particular data inquiry or activity.

In the description of the preferred embodiment herein: (1) "user" includes, but is not limited to, an entity or individual and parties acting on their behalf, parties in exchanges between financial institutions and customers, clients, account holders, creditors and debtors, financial institutions and their service providers, financial institutions and other financial institutions, and merchants and customers; (2) "financial institutions" refers not only to traditional constituents, such as banks, credit unions, saving and loan institutions, trust companies, and exchange bureaus, but also to financial investment firms, auditing companies, insurance companies, car dealers, and credit bureaus, namely, any business, firm or person accessing or providing financial information or services; (3) "message" is a collection of data fields sent or received together between software applications, systems, or networks containing control information and content; (4) "mechanisms associated with a request" include, but are not limited to, checks, cards (including credit, debit, smart, or any other device used to initiate a transaction and/or information query), EFTs, coupons, loyalty points, stored value systems, and payments and/or information exchanges to and from government instrumentalities (e.g., securities, coupons, loyalty points, electronic benefit systems, etc.) in both wired and wireless transactions; (5) "communication mechanisms" of the request include verbal, audible, optic, written, imaged, and the like, both wired and wireless, and analog and digital; (6) "channels" include both wired and wireless devices, digital and analog, directly and through a network, designed to enable access, such as card readers, ATMs, personal telephones and other voice units, VRUs, pagers, cable television, PDAs, PCs, vending machines, lock box processing, business or government computer systems and networks, and devices and the like, as well as mechanisms to enable access, such as those initiated by a teller, a cashier, a client, a financial institution, a merchant or a purchaser at a point of sale or transaction, and the like; (7) "credential" is a set of information, which is used by a user to establish an electronic identity to a computer system as part of an authentication and or authorization protocol. A credential may be associated with ancillary information supporting a user's right to possess that credential (such as a PIN or private signing key). Examples of credentials include, but are not limited to, user identifiers, passwords, ATM/credit card/PIN numbers, checking/saving account numbers or information, digital certificates, PKI standards, biometrics, other object security devices, and the like; (8) "determinate" means an algorithm, formula, service, program, programmatic call, and the like.

The preferred embodiment complements the existing financial system infrastructure, providing convenience, versatility, enhanced security and fraud detection, and is similarly adaptable to information systems infrastructure. (9) "value'" herein includes information, data and the like, also having value to a user in the scheme herein.

A benefit of the invention is the ability to allow a user to employ a service that can act in a single sign-on or multiple sign-on capacity for access to a multitude of resources. Additionally, when a change or update is made to information associated with a user or specific activity, the change can be made across systems and services linked to the invention, thus providing a means to synchronize a change of information across any or all channels and services employed by that user and/or institution linked to the system. The present invention also reduces administrative overhead by integrating services, credential storage, and interfaces to other services or entities to provide a seamless service view to the user over multiple related or nonrelated channels. The present invention allows a user to use existing credential systems while providing a path to new objects or systems with reduced impact to the user, channel, device, or service as compared to current approaches.

DETAILED DESCRIPTION OF THE INVENTION

Figure 1A:
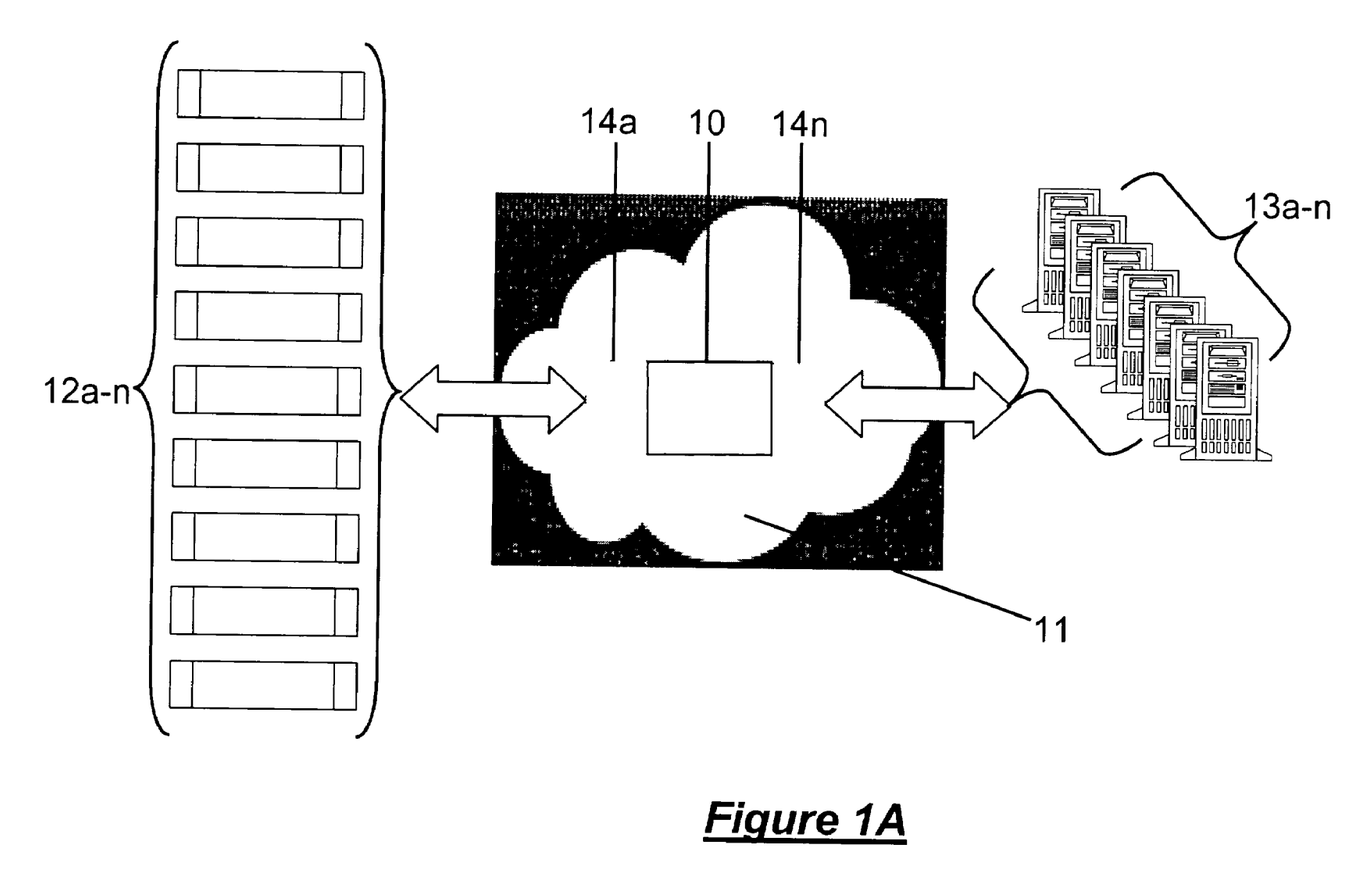
FIG. 1A is a schematic overview of the invention.
Figure 1B:
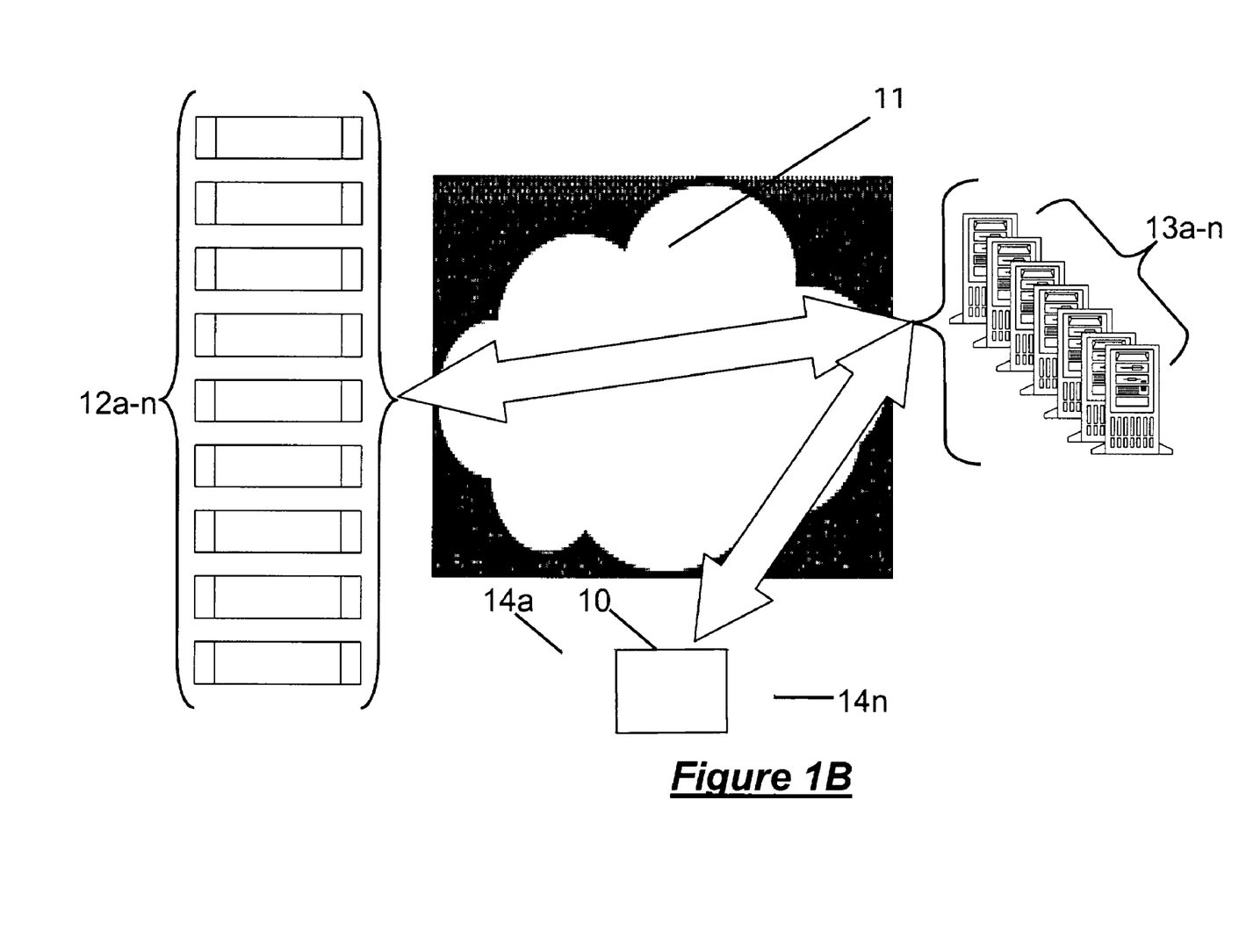
FIG. 1B is an alternate embodiment of an overview of the invention.

The present invention provides for the integration of related and nonrelated channels, devices and services. FIG. 1A shows an overview of the present invention. The invention comprises an integrator 10 in contact through a network 11 with at least one user having a relationship with the integrator 10 or a relationship with another user or entity that is connected to the integrator. The user may be associated with one or more channels or institutions 12a-n (which may optionally be used by an end user), or the user may be a destination in a plurality of destinations 13a-n, as shown in FIG. 1B. In the preferred embodiment, the user is a financial institution and the network is the Internet. The system may be accessed using both wired and wireless means.

The system may include one or more adapter 14a-n optionally linked to one or more than one channel 12a-n, one or more than one destination 13a-n, and/or to the integrator 10. The adapter 14 translates a message from a channel 12 into a normalized language or dialect for use across the system.

Figure 2A:
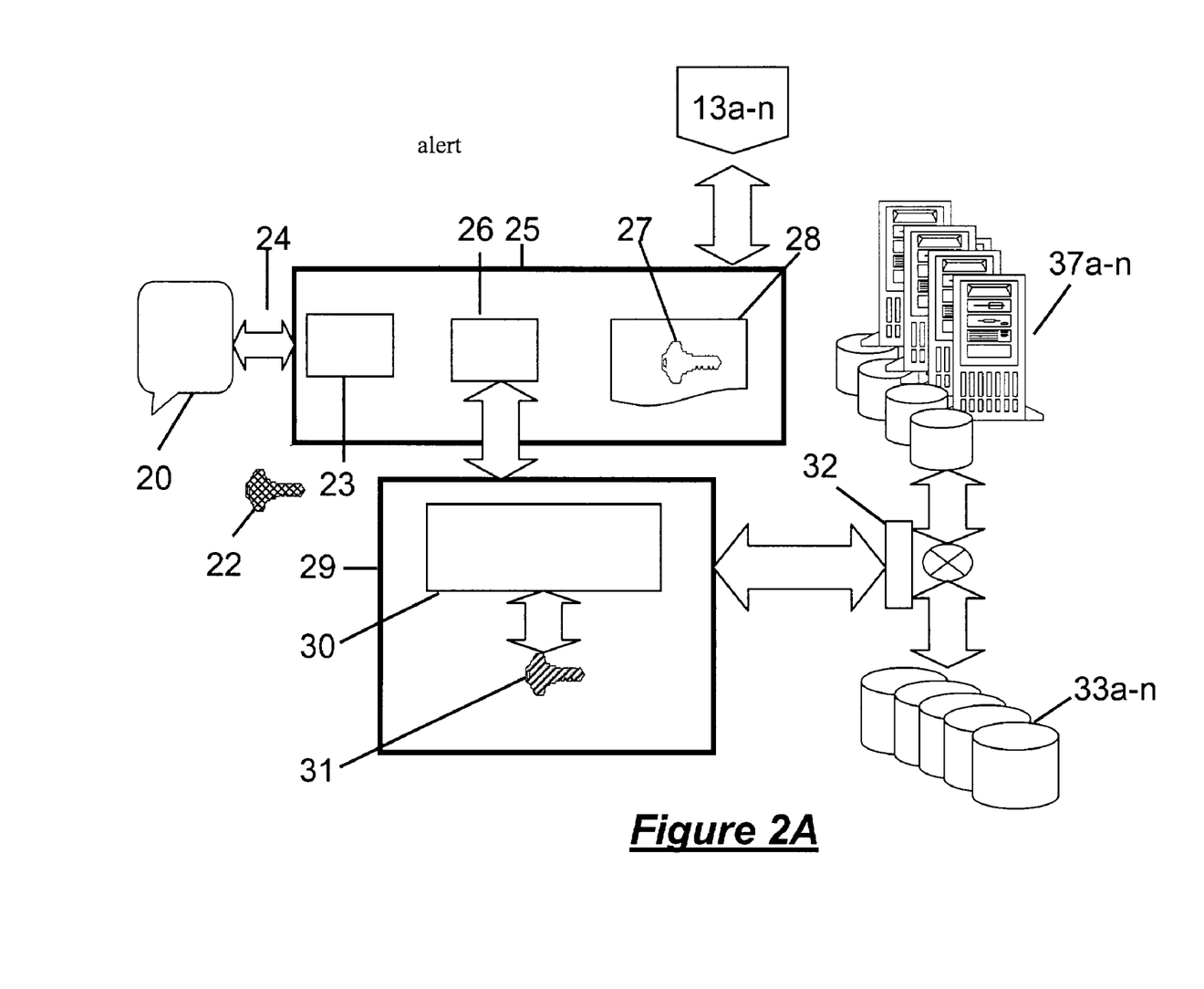
FIG. 2A is a schematic overview of a user interfacing with the invention.
Figure 2B:
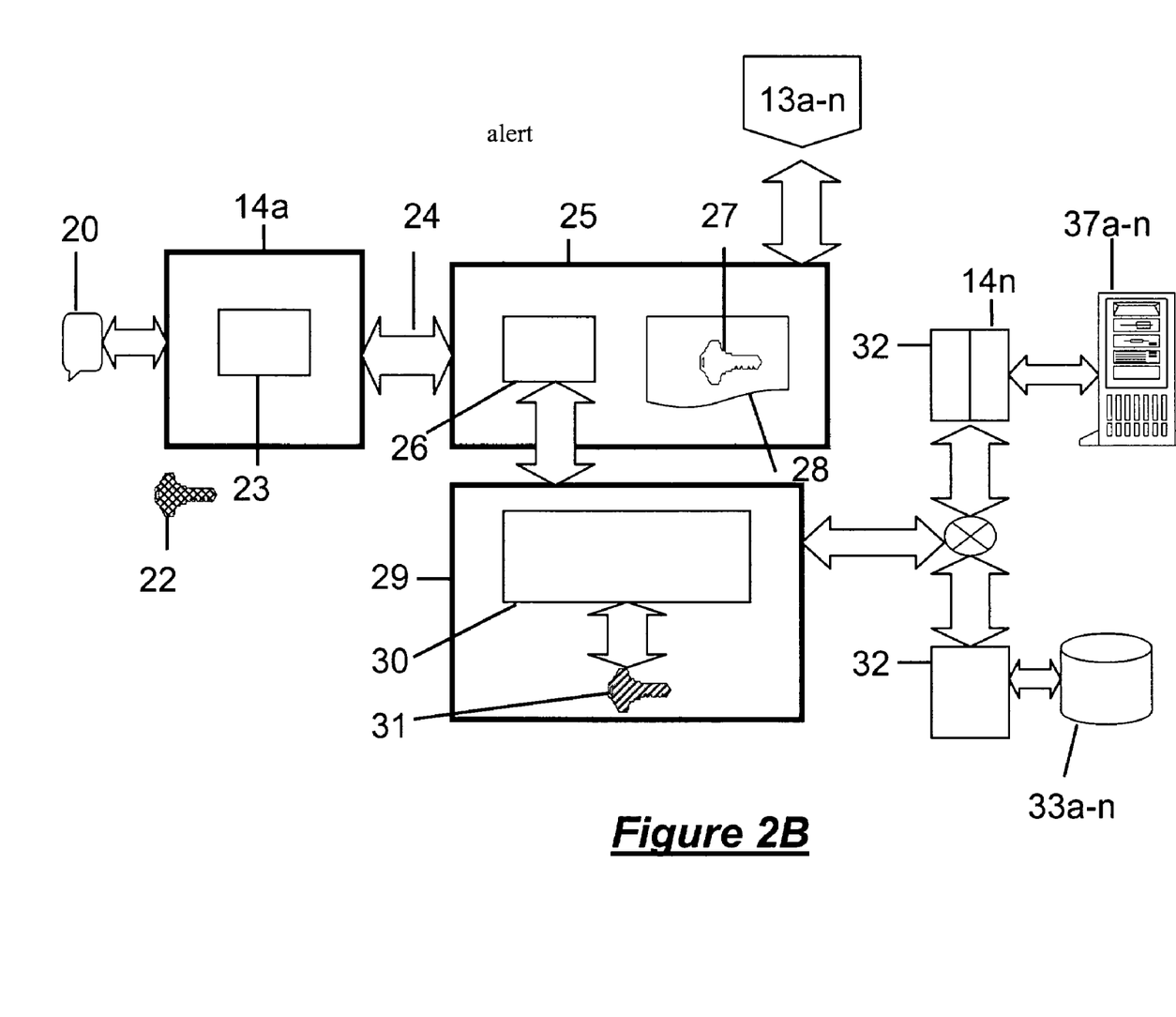
FIG. 2B is a schematic overview of an alternate embodiment of a user interfacing with the invention.
Figure 3:
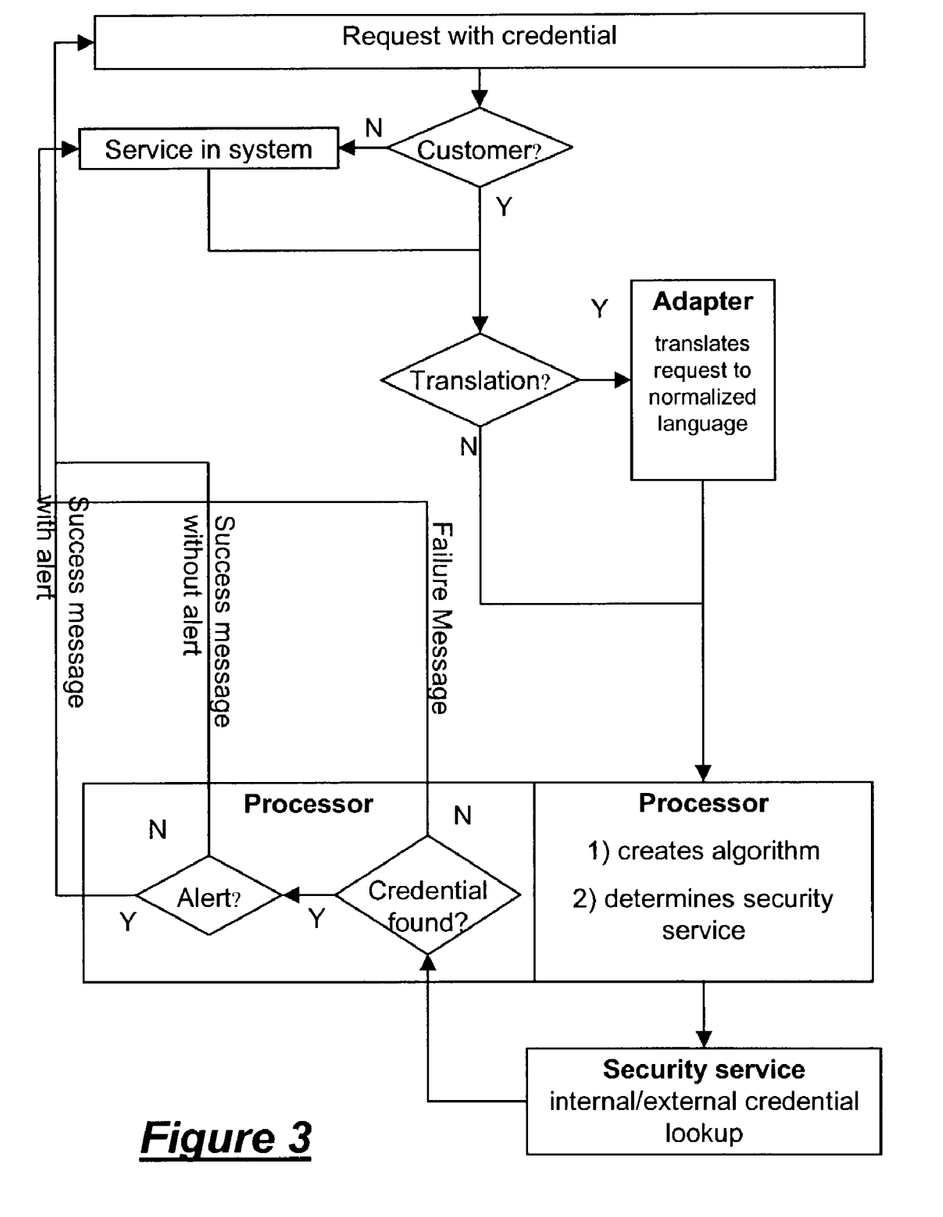
FIG. 3 is flow chart of the invention.

FIGS. 2A and 2B are schematic depictions of the invention processing a request by a user. The user initiates a request in the form of a message 20 through a channel 12*a*-*n*. The message 20 includes information, such as a sign-on protocol 43 (See FIG. 4) necessary for a request requiring authentication, authorization, or a combination, and may include additional information, such as a credential, encryption tag, process ID, or program for encrypting data or for data encapsulation via an encryption envelope.

As an example, a message in the preferred embodiment would include the name of the request, such as a request for authentication; the name of a request component, such as the type of channel 12 is an ATM; an element of the request containing data, such as user ID; and the name of a simple business request within a service, such as an account balance inquiry.

When the message 20 is composed in a nonstandardized language, the adapter 14*a*-*n* translates the message 20 to a normalized language, such as XML in the preferred embodiment. The elements of a request are standardized so that applications to be performed by the destination 13*a*-*n* may expect specific semantic requirements. For example, business requests may be qualified into service groupings based on a specific semantic, such as IFX in the preferred embodiment. Groupings may be offered by a given destination 13*a*-*n* designating a particular request, such as "check balance."

FIG. 2A depicts the receipt of a message 20 composed in a normalized language. The message 20 is received by a processor 25, which coordinates a channel device session identification look-up 22 and creates a session cache entry 23. The processor 25 decodes the message 20.

Based upon the content of the message 20 and/or any mix of the following: the particular channel 12*a*-*n*, the request contained in the message 20 made by a user using that channel 12*a*-*n*, the services provided from that channel 12*a*-*n*, the owner of the channel 12*a*-*n* or family of service providers that it belongs to, the credential presented and/or required for authentication and/or authorization of a user using that channel 12*a*-*n*, and the language and/or interface of the destination 13*a*-*n* of the user's request contained in the message 20, is recognized.

Before processing the content of the message 20, if the message is from an untrusted channel, the sign-on information is validated as shown in the Figures. After any required translation by the adapter 14, the processor 25 determines and executes a determinate. The determinate is used to determine the security service 29 used to validate the sign-on information contained in the message 20. Validation is performed by a multidimensional decision process that may include the comparison of sign-on information contained in the message 20 to data, such as a reference table or corresponding determinate that includes specific information associated with the user, including passwords, biometrics, codes, and the like, stored either internally or externally at the security service 29. Validation may also be based on confirmation of role and/or rules associated with the user, device or channel. If no verification is attained, a denial is sent back to the processor 25, which relays the denial to the channel 12, which may prompt the user to retry the sign-on protocol or request additional identifying information, such as a preset answer to a question.

Referring to FIG. 2A, on a positive response to the sign-on validation process 26, the system generates a session key 27. The session key 27 is used to create a session object 28 that holds information about the user, including sign-on and channel session context, to bind channel 12 activity with the execution of the request and a given user or entity associated with a user or group of users. The information held may be used for subsequent message processing. The system maintains the session 28 with the user at the channel 12 using a unique session ID until the user closes the session 28 or some idle time-out occurs. The processor 25 destroys the session 28 when the session expires or is abandoned. The information concerning the session and all interactions are logged for auditing and reports.

In the preferred embodiment, when the session 28 is established, a service profile is created listing valid items, requests, and/or services that may be contained in a message 20 and/or executed by the user and/or device making the request. The service profile corresponds to a profile 40 (See FIG. 4) listing products, accounts, services, and so on, available for that user at a given destination 13*a*-*n*. Further access control may be applied based on core elements included in the message 20 or on file profiles for service providers and the like.

In an embodiment of the invention, the processor 25 transmits the decoded message to a security service 29. The security service 29, which may be internal or external, interprets the decoded message through the appropriate BMR 30 and establishes a BMR session key 31. Each BMR can execute in parallel. A data management routine (DMR) 32 is used to compare channel credentials optionally centrally stored and managed by the system 33, or obtained from remote servers, databases, or systems 37, which may include the destination 13. The DMR 32 integrates nonrelated systems for use by the system.

The DMR 32 and the adapter 14 can support Federal Data Encryption Standards (DES) and crypt password encryption as well as other algorithms and other such instruments for secure data manipulation and transmission. The DMR 32 may be configured to store and retrieve credentials managed by other systems or to perform the authentication management functions (enroll user, create credential, expire password, etc.).

The processor 25 then formats the decoded message and sends the formatted message to the destination 13*a*-*n* for processing. The destination's response to the message can be encrypted and returned through the appropriate channel 12*a*-*n* to the user. Should no credential be found for the user, the processor 25 sends a reply denying the request to the user. Each interaction is logged for auditing and reporting.

FIG. 2B depicts the use of an adapter 14 to translate a message 20 received in a channel's 12 native format. The adapter 14 coordinates a channel device session identification look-up 22 and creates a session cache entry 23 with unique identifiers to each message in order to proxy and manage a session. The unique identifiers allow tracking of a given message as it flows through the system. The session cache entry may be used for subsequent message processing; in the case of the failure of adapter 14*a*, a back-up adapter 14*n* may continue the session. The unique identifiers are logged for reports and audits.

In the preferred embodiment, the adapter 14 comprises software capable of translating and standardizing a semantic, data format, transport, and/or wire protocol of an input signal such as the channel message 20 and communicating the message 20 to a variety of destinations 13*a*-*n*. The adapter 14 of the preferred embodiment further uses an XML format to encode the message 20. The adapter 14 then transmits the translated message 24 to the processor 25. Before processing the content of the translated message 24, the sign-on information is validated and a session cache established similar to that described above for the embodiment not requiring the adapter.

After validation, the processor 25 formats the message and sends the formatted message to the adapter 14 or to a second adapter 14*n*. The adapter 14 or second adapter 14*n* translates the formatted translated message into a format understood by the destination 13*a-n* for processing. The destination's response to the message can be encrypted when returned to the user.

In the present invention, all interactions are logged. Journaling is also supported.

Figure 4:
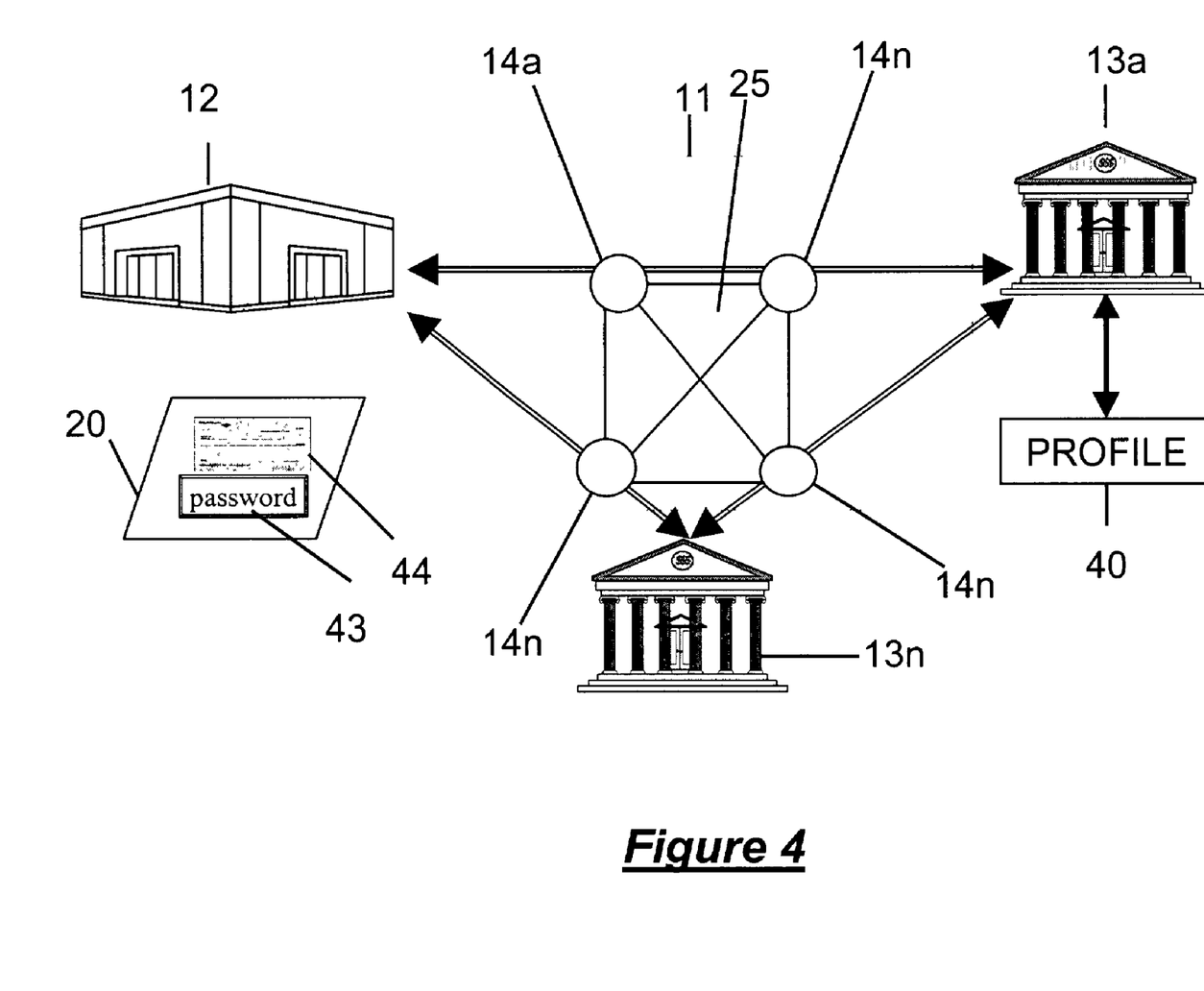
FIG. 4 is a schematic overview of a check settlement embodiment of the invention.

FIG. 4 shows an embodiment of the invention for the secure processing of financial documents, such as a check. The process is initiated at a channel 12, such as a point of sale or transaction from a purchaser to a merchant, capturing certain information, such as the MICR line and check amount from the check of the purchaser and a purchaser-supplied credential 43 for authorization and/or authentication. Further access control may be applied based on user-to-account (in the case of on behalf of), owner to account, account-to-account relationship, and service provider and requester to user relationship rules.

The channel 12, which is either trusted or has undergone a credential authentication or session key validation, is linked through a network 11 linked to the system of the invention. The message 20, which includes information captured at the point of sale and level of service requested, may require translation by an adapter 14 linked to the processor 25, which is further linked to at least one destination 13 such, as in the embodiment, the financial institution holding the checking account of the purchaser.

In the preferred embodiment, an adapter 14 converts any message 20 transmitted in a nonstandardized language to an XML message 24. The adapter 14 then routes the translated message to the processor 25, which decodes the message, confirm the user, and determines a determinate, used to determine the destination 13*a-n* of the request. The processor 25 forwards the message to a destination 13*a-n* that can respond to the request made from the channel 12. An adapter 14*a-n* linked to the processor 25 and the network 11 may be used to translate the message into a format recognized by the destination 13*a-n*. The adapter 14*a-n* adapts the message 20 to an acceptable format that will allow the destination 13*a-n* to respond to the request of the message, and then forwards the message to the destination 13. The destination 13 determines if the request of the message is available to the user through comparison of information contained in the message to a preexisting service profile 40 (as shown in FIG. 4) for that user. The service profile 40 in the checking embodiment includes, but is not limited to, account validation, funds availability, verify against positive pay files, evaluate for propensity for fraud, and the like.

The destination 13 evaluates the request of the message and sends a resultant response. An adapter 14*a-n* may be used to translate the destination's response into a suitable language (such as an XML message in the preferred embodiment), and routes the response to the processor 25. The processor 25 decodes the response, determines routing, and returns the response to the channel 12 (an adapter 14*a-n* may be used for translating to the proper format).

Referring to FIG. 4, a validated merchant using an embodiment of the invention captures account information 44 from a purchaser at the point of sale 12. The purchaser supplies a credential 43, such as a password. The merchant transmits the information through a network 11.

The message 20, if in a nonstandardized language, is translated into a normalized language. Based on the information in the message 20, the purchaser's financial institution is determined and the request of the message is transmitted, using an adapter to translate to a recognizable format if required. The purchaser's financial institution performs the request of the message, such as determining whether the purchaser has a valid account with sufficient funds. The sufficiency of the funds is a specific amount associated with a transaction between the merchant and the purchaser. Upon confirmation of the account and funds, the purchaser's financial institution sends an approval message. The approval message is stored and forwarded to the merchant's point of sale (an adapter may be employed if necessary). Prior to transmission, the system may perform an alert look-up. Alerts include, but are not limited to informational updates, fraud alerts, loyalty points, coupons and the like. Using the invention, a merchant is able to confirm in near real-time that a purchaser has a valid checking account and sufficient funds in that checking account to cover the transaction at hand.

Optionally, the stored approval messages may be posted at a predetermined time interval. The purchaser's account is debited by, and a corresponding amount is credited to the merchant's account at the merchant's financial institution (adapters may be employed if necessary). The system logs each settlement transaction and is capable of generating reports.

Figure 5:
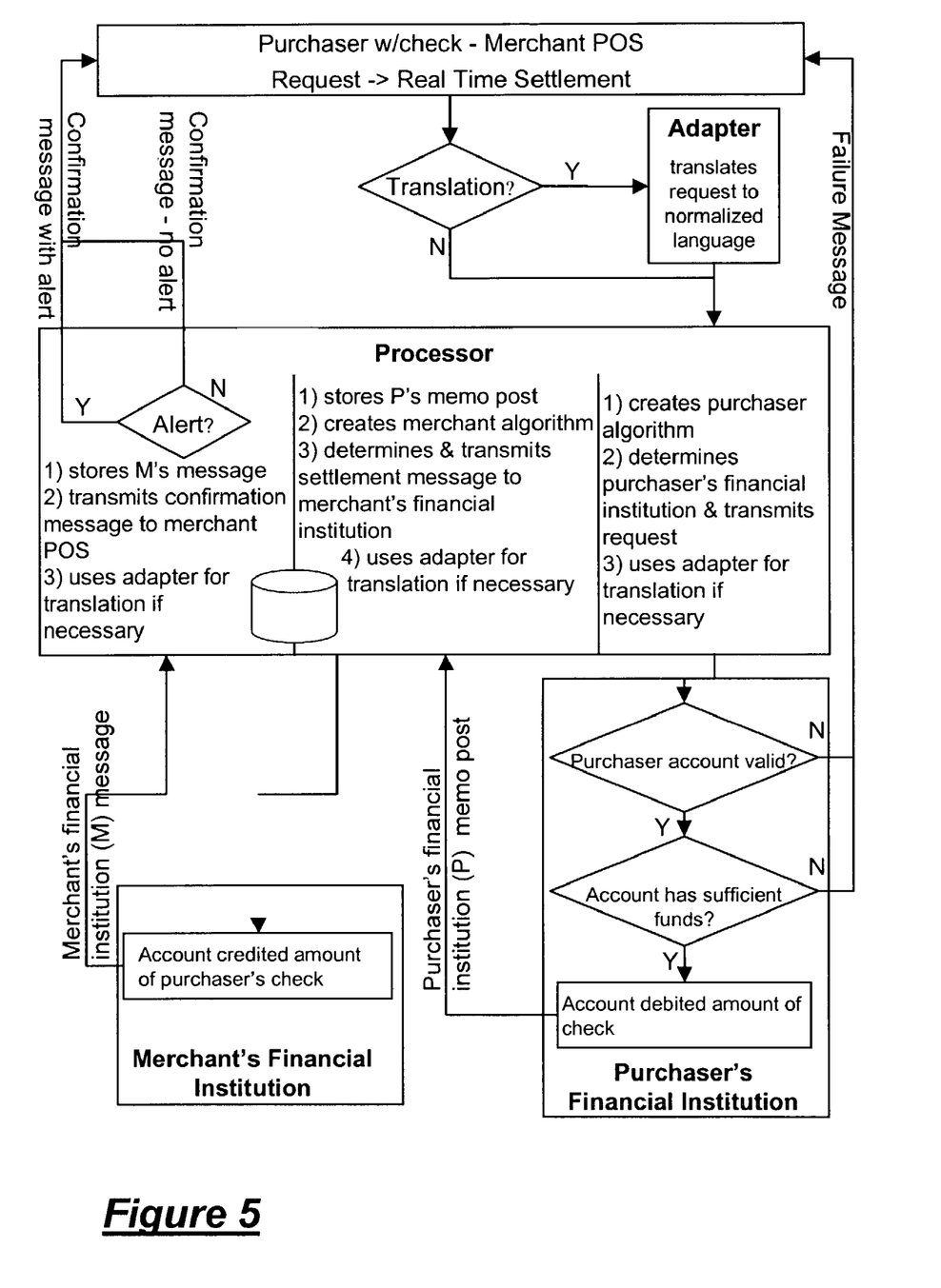
FIG. 5 is a flowchart of an embodiment of the invention where a merchant may determine sufficiency of funds in a purchaser's account.
Figure 6:
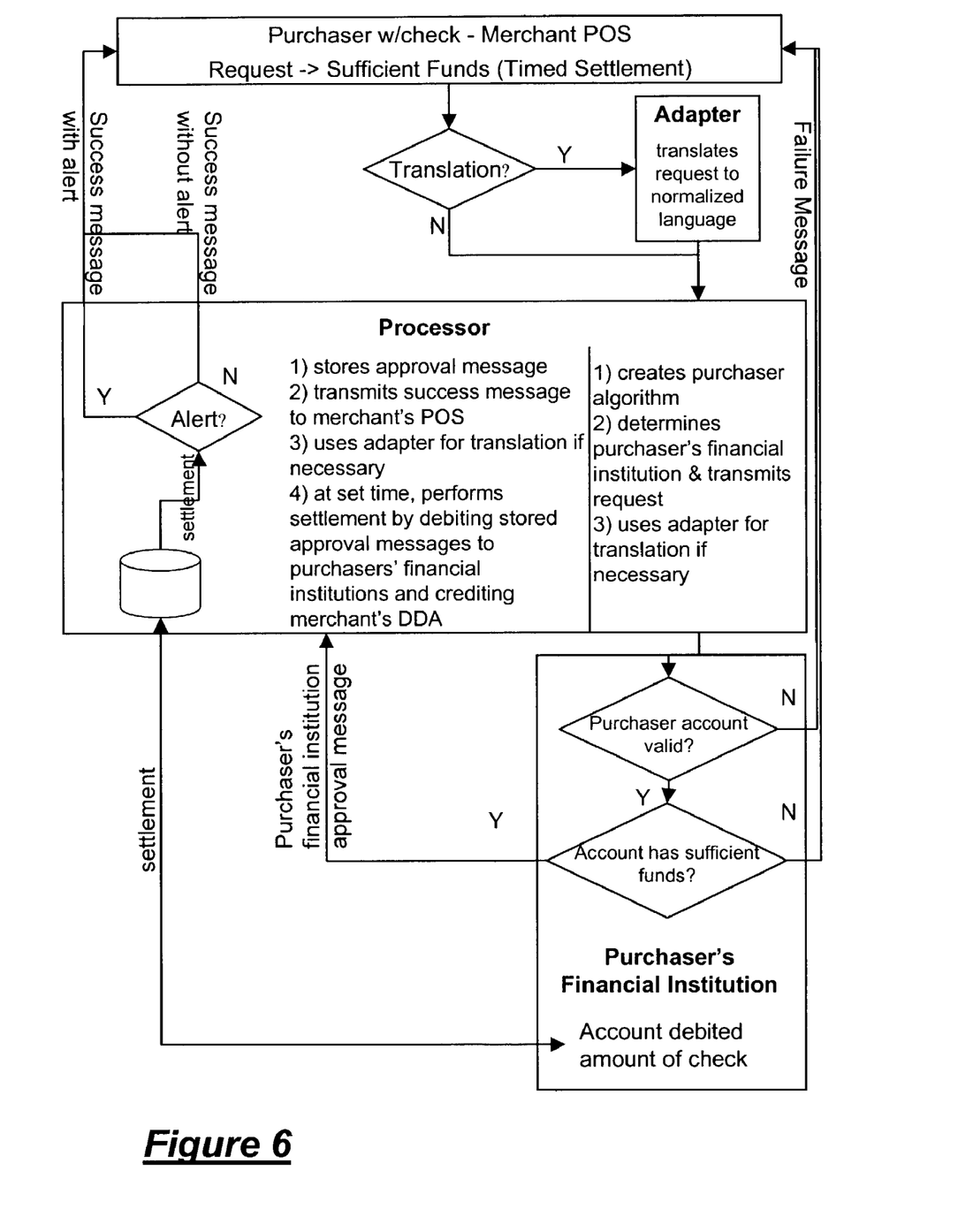
FIG. 6 is a flowchart of a check settlement embodiment of the invention.

The message 20 from a channel 12*a-n* may include additional information or requests, such as an authorization. As shown in FIGS. 4, 5 and 6, additional embodiments of the invention, the request is an authorization for settlement, such as that associated with a check transaction to a merchant. In this embodiment, the message 20 includes information specific to the channel 12, such as a merchant's financial institution, account number, etc. that associates a channel with a destination 13*a-n* linked to the system. The destination associated with the channel and the destination of the purchaser may be the same 13*a* or different 13*n*. As shown in FIGS. 5 and 6, the pre-validated merchant transmits the information through a network. The message may be translated, if necessary, into a normalized language. The invention determines and executes a determinate based on the message, and determines the purchaser's and merchant's financial institutions from the determinate. The request of the message is transmitted, using an adapter to translate to a recognizable format if required. The purchaser's financial institution executes the request of the message, such as determining whether the purchaser has a valid account with sufficient funds. Upon confirmation of the account and funds, a memo post is transmitted debiting the purchaser's account by the amount of the check and crediting the merchant's account an amount equal to the amount of the check (adapters may be employed if necessary). A confirmation is transmitted to the merchant's point of sale, which may include an alert, may use an adapter if required, and may be printed. The transaction is completed in accordance to the settlement information of the message. Settlement may be at the time of the transaction or performed in a batch process. Records of the transactions are created and posted to a log file, which may be used to generate reports.

Additional processes that may be defined for financial instruments include:

For Checks: 1) Account verification, 2) Participant identification and/or authentication, 3) Payment authorization, 4) Positive payment review, 5) Stop payment validation, 6) Transaction imaging, and 7) Funds settlement.

For Debit Cards: 1) Account verification, 2) Participant identification and/or authentication, 3) Payment authorization, 4) Funds settlement, and 5) Transaction archiving.

For Credit Cards: 1) Account verification, 2) Participant identification and/or authentication, 3) Payment authorization, and 4) Funds Settlement.

For Securities: 1) Requested transaction information summary, 2) Transaction completion, 3) Transaction archiving, 4) Payment information, and 5) Funds settlement.

For Coupons: 1) Account verification, 2) Participant identification and/or authentication, 3) Transaction authorization, and 4) Account Settlement.

For Loyalty Points: 1) Account verification, 2) Participant identification and/or authentication, 3) Payment authorization, 4) Positive payment review, and 5) Funds Settlement.

For Government Payments: 1) Account verification, 2) Participant identification and/or authentication, 3) Payment authorization, 4) Funds settlement, and 5) Transaction archiving.

The system can communicate with a variety of services, including Lightweight Directory Access Protocol (LDAP), Core Systems, Resource Access Control Facility (RACF), Access Control Facility (ACF2), web banks, UNIX systems, and the like. The present invention integrates with existing channel authentication and authorization mechanisms and credentialling types. The system may employ existing credentials, such as those issued for ATMs, web sites, voice recognition units (VRU), devices used to connect to a mainframe (3270), etc., or establish new ones. The system is capable of using existing authentication systems, such as RACF, ACF2, channel applications, device algorithms, LDAP, Public Key Infrastructure (PKI), etc. A user may use existing credential management processes and procedures or establish new processes depending on the device, user, request and service being supported. Unique information distinguishing the user and device within one or more typical channel systems include the following:

| | |
|---|---|
| ATM | ATM Terminal ID + Card Number |
| Teller | Terminal ID + Teller ID (+ Account #/Customer #) |
| VRU | VRU Terminal ID +Port # |
| Call Center | Station ID + Agent ID (+ Account #/Customer #) |
| Platform | Terminal ID + Officer ID (+ Account #/Customer #) |
| Web | Session Cookie Value |

The use of the present invention for authentication/authorization in secure financial transactions allows for convenience and flexibility. The invention provides for trusted and untrusted connections and can handle many types of credentials and other types of access control mechanisms. The system is easily extended to handle new connections and credential types.

The present invention invokes the corresponding authentication and/or authorization procedure and system based on the type of channel, application, user role, connection type, service requested, credential type, etc., and can implement access control policies based on the criteria linked to a channel, device, service, user(s), institutions, and service requests. The present invention handles session management across channels and has the ability to proxy session for those interfaces capable of sharing a session key. This eases integration of existing systems and supports new channel integration while insuring consistent activity auditing and reporting, and enables participants to complete transactions through existing technologies, such as a web browser, in real-time or in a batch process. The system includes technology to authenticate and authorize transactions and enable the secure exchange of settlement-related documents.

An interface is provided that allows multi-credential, multi-service, multi-role, and multi-channel based routing to multiple authorization and authentication providers independent of the location of the credential, language or dialect used by the channel. The use of such an interface provides for the creation of a framework to enable entities to communicate and perform transactions instantly or nearly instantly, and seamlessly with and without prior knowledge of the transacting agent, such as requiring additional passwords or other security objects for separate services.

In addition, the system allows for data persistence, in the storage of information internal to the system. By allowing for application logic across incompatible systems, the invention can universally update information, such as a change of address of a user. The universal update feature of the invention eliminates the need for mass mailings to users for updates in the transfer to new systems.

In addition to internal aggregation to a bank or financial services company, the invention also allows for the integration of services and systems across company and geographic boundaries. Integration of services (networks) allows all banks that are connected to the invention to share services and products in a fashion that is seamless to the customer. Seamless integration is accomplished by the nature of the system having the ability to securely communicate among the many systems connected to it. The integration system is independent of network ownership and location. By the nature of the interface, the message and the service requested, the system can process the decision to service a request in real time based on the knowledge of all of the other interconnected systems. Aggregation across company boundaries, geographical boundaries, and company or business entities results.

In an information model, the following are examples of accessible and changeable data within a range of personal and enterprise and public and innocuous to extremely confidential and sensitive (in no particular order): personal information, user credentials, solicitation preference, personal financial information, income and income sources, competitor, accounts, liabilities, insurance, education and employment data, reference data, credit report information, employment information, customer (involved party) interactions, in-bound and out-bound interactions, and multiple events per interaction. In legacy systems, the information may be in different dialects on different data stores in different locations.

In the financial institution model, information in disparate networks is useful for product solicitations and determinations such as insurance, property, casualty, life, disability, health, automobile, home owner, renters, loans and leases, installment loans, residential mortgage, vehicle lease, commercial loans, commercial real estate, equipment lease, investments, mutual funds, security, fixed income, money market, equity, and annuity.

Similarly, criteria related to a customer may include behavioral information, customer profitability, product profitability, customer behavioral, customer wallet-share, customer attrition, channel efficiencies, sales and offers, product profitability, channel, and channel efficiencies. On the enterprise level, information and activity categories include control, enterprise security and authentication, session management, system processing, journaling, application parameters, adapter metadata, error and event logging, product catalog, organizational structure, employees and employee roles, regulatory information, Patriot Act, Fair Credit Reporting Act, and Graham, Leach, Bliley Act.

An aggregator, interaction manager is provided for business management routines (business rules) which centralizes business rules in order to facilitate their consistent application across the disparate networks and systems of the enterprise. The system insures appropriate processing sequence, enables maximum flexibility, allows business rules to be independent of system implementation, facilitates data management routines (data access), separates data access from the physical data storage mechanism, enables portability among market leading database management products, functions as integration point for universal adapter to core processing systems, enforces consistent use of information, ensures accuracy and integrity, and provides model management. The system benefits include an isolation of data access from business logic enabling flexibility in implementation, consistent representation of information across the enterprise, the elimination of dependence on unrelated or unreliable systems through data persistence, support for transactional processing as well as decision support, and insures consistent application of business rules across the enterprise through reusable business functions.

Enterprise configurable objects manageable by the system include the grouping of functions and messages to fulfill a customer experience and a pre-built reusable library of messages. The system is configurable to support all customer interactions at all delivery channels for a truly enterprise-wide solutions and supports customer analysis for more informed service, provides a single comprehensive, proactive view of the customer, and enables consistency in sales and service approach. Enterprise configurable object categories for the financial industry with which the system may be used include, but are not limited to: sales and cross sales, customer inquiry, customer services, customer change, customer issue resolution, information request, customer notification, institution initiated, new account opening, next likely sale, offer complementary services, customer needs analysis, complete customer profile, retirement planning, college planning, debt consolidation, tax planning, estate planning, financial planning tools, insurance needs analysis, product comparisons, loyalty promotions, loyalty indication, offer response tracking, attrition indication, customer personalized pricing, sales scripting, deposit verification, fee assessed, check cleared, unrecognized transaction, direct deposit verification, payment amount verification, address on statement, statement cycle date, account information, balance, loan payoff amount, payment information, year end statement summary, missing statement, combined statement information, scheduled bill payment, payments not received, payee setup, payment notifications, notifications of bills arrived, online banking access maintenance, ATM/check card linkage, overdraft protection, inquiry about previous request or problem, inquiry about loan approval status, order checks, stop payments, statement copy, copy of check, obtain a copy of transaction receipt from credit card, other document copy (deeds, liens, etc.), purchase money order, purchase travelers check, purchase cashiers check, withdraw cash, deposit funds (cash/check), cash check, close account, automatic withdrawals, wire transfers, funds transfers, change credit limits, electronic bill presentment, electronic bill payment, account aggregation, name changes, address maintenance, phone numbers, e-mail, demographic information maintenance, PIN maintenance, username maintenance, marketing solicit/do not solicit, alerts by product, alerts by channel, account owner maintenance, timing of statement, statement address, time deposit interest payment allocation, accounts linked to ATM/check cards, select PIN for ATM/check/credit cards, accounts linked on combined statement, accounts linked to sweep, enroll for service (online banking, combined statement), enable accounts for service, accounts not showing up (combined statement), dispute transaction, dispute transaction amount, missing deposit, missing payment, request a fee reversal, lost/stolen/nonworking ATM/check card/credit card, payment book not received, username unrecognized, password unrecognized, web is down, specific ATM availability, poor service, previous request not completed, long waits (banking office, VRU, call center), employee altercation, download transactions to PFM, amortization schedule, ATM card withdrawal limit per day, product features (fees, bundles, etc.), product disclosures, product availability (location, etc.), branch products and services available, branch locations/addresses, branch hours, branch phone numbers, ATM features, ATM locations, call center phone numbers, call center hours, corporate address, corporate phone numbers, balance reaches a limit, nonsufficient funds (NSF), payment is due (credit card, installment loan, mortgage, vehicle lease, commercial loan), payment was received, CD is maturing, payment cancelled, transaction limits met, recurring payment is about to happen, bill was presented, previously reported problem has been resolved, product rate thresholds met, product availability, new branch locations, changed ATM services, branch hours changed, birthday greetings, customer anniversary, channel usage suggestions, account holds, add new customer, customer search, customer profile, customer maintenance, customer address maintenance, add account, add ATM/check card, activate temporary ATM card, add bill payment, add payees for bill payment, customer ownership to accounts maintenance, add account mailing address, establish/maintain customer "total relationship," and fraud inquiry. Each category differs in relative value, sensitivity, customer and enterprise relationship, need to know, change authorization criteria, and other practical factors in an enterprise activity concerning a financial relationship in which the who, where (source) and activity criteria are interrelated and determine identity, authorization and access to an activity. Thus, the system is a flexible application of business components to address business needs allowing incremental implementation of components enabling a focus on high priority needs, in which new business functionality can be introduced quickly and without impact to existing systems. In the embodiment herein relating to a merchant and customer payment method, it is evident that the terms "merchant," "customer" and "payment" refer in the same interchangeable method to different users having predetermined authority profiles with respect to payment and data transactions, look ups and activities. It is intended that the claims, despite their literal meaning, be read to reflect such an interchangeable flexibility in the method and system, lest a separate claim be presented for each one of the numerous combinations and permutations of the authority profiles, payment and data transactions, look ups and activities that are particularly identified above.

The physical platform configuration benefits permit vertical and horizontal scalability flexible communication options, noninvasive integration to existing systems, and high availability. Among the platforms supported are IBM OS390 Parallel Sysplex, AIX, Linux, Solaris, Database, DB2/UDB, Oracle, Preferred J2EE Application Server, WebSphere, Enterprise Integration, J2EE Within Our Product, MQ For External Connectivity, and others.

The system employs a standardized message architecture; the store and forward processing of messages maximizes throughput and scalability; messages provide a convenient unit of translation between disparate protocol vocabularies; the many-to-one (any to hub IFX) messaging vocabulary minimizes integration effort and provides standardization content-based routing allowing multiple service providers to be integrated into a single service and a seamless experience for the customer. IFX provides an open standard, eliminating the need for a second message layer, leverages multiple industry players for best-of-breed solutions, provides a robust message set, meshes nicely with XML, and is extensible in a predefined process.

Figure 7:
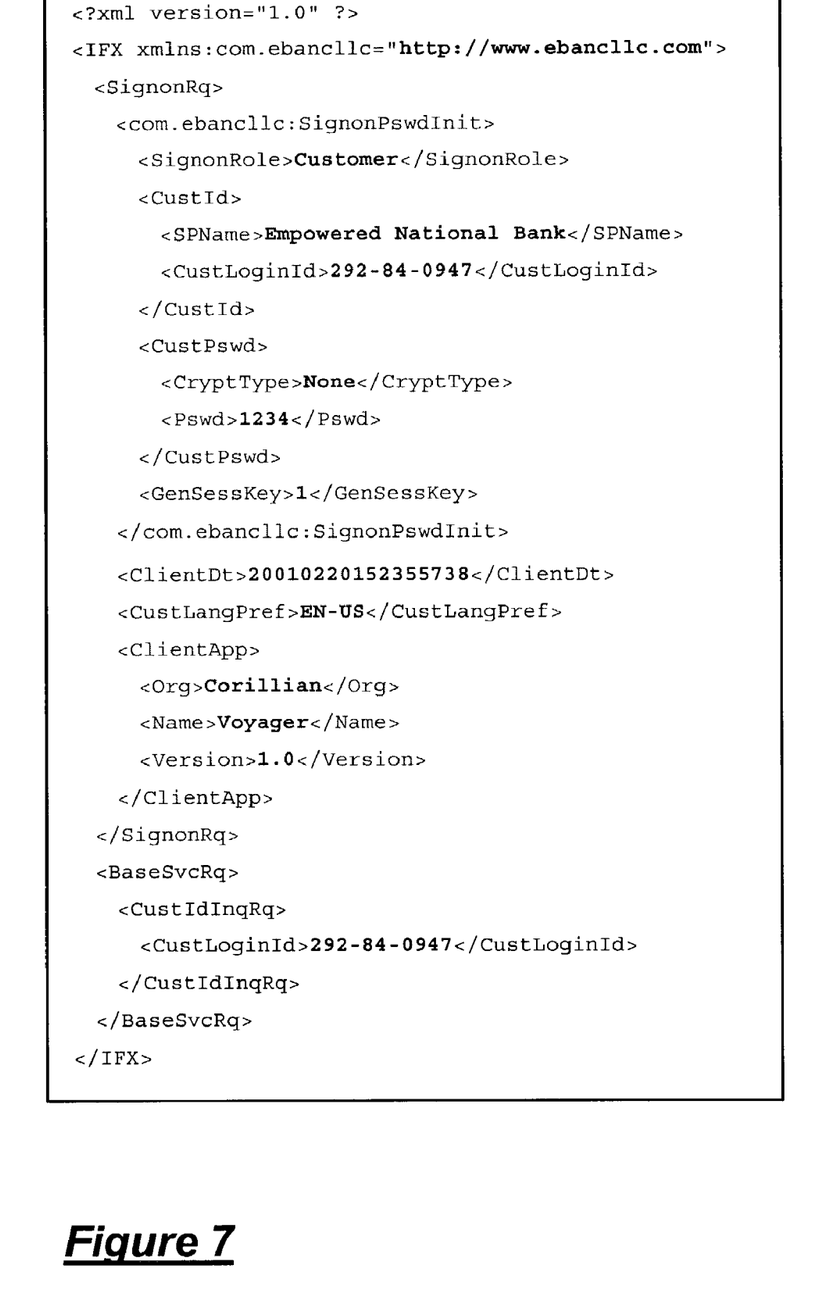
FIG. 7 is a message example.

In a processing scenario, a port object accepts a message in the delivery channel's native format, a translator leverages meta data repository to convert into IFX format, each message is verified against the session cache and user authenticated if necessary. A universal adapter translates IFX into core processing system format. The object port sends the message to the appropriate system. FIG. 7 shows a message example including the parameters: the name of the request (the sign on request occurs in every IFX document), the name of a request component (called an aggregate in IFX), and an element of the request containing data. The aggregates and elements of a request are standardized so that applications may depend on specific semantic requirements always being present. Business requests are qualified into service groupings (Not all possible service grouping are required, but if a grouping is offered then all messages of the group must be implemented.) and the name of a business request within a service. Each interaction is logged. The object processor provides load balancing, fail over, recovery, transaction processing and message routing. The interaction manager leverages the service directory to dynamically invoke all of the appropriate business management routines. Each business management routine can execute in parallel. The interaction manager leverages the service directory to dynamically invoke the appropriate data management routines. The data management routines can access the unified information model or the core processing system data.

Figure 8:
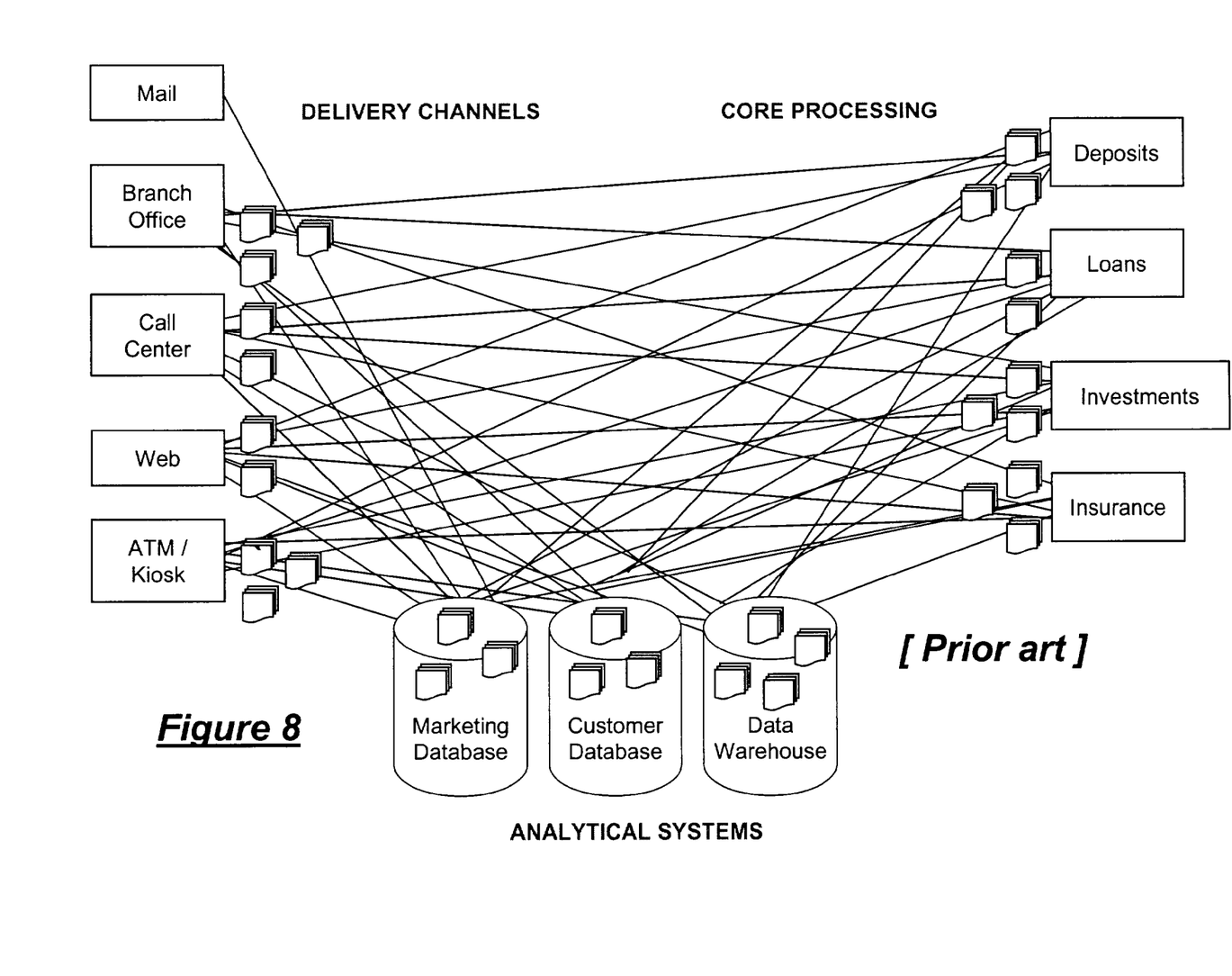
FIG. 8 shows the point to point connectivity requirements in prior art interconnection methods when disparate networks and or systems are attempted to be connected.

The advantages of the dialect normalized system of the invention, in comparison with a point to point system for interfacing systems, networks or services as shown in FIG. 8, may be estimated mathematically. The number of unique interfaces X (number of interfaces required) that must be defined and maintained in a traditional point to point approach is determined by the formula X=Sum (N−1) where N→1 in which N=# of systems. In the normalized system herein, the number of interfaces X equals the number of systems, namely, X=# of systems/interfaces in the environment. The table below provides an example of the impact of the present system:

example, closed or overdrawn accounts, or identities compiled in connection with the Patriot's Act, and the like. The present invention allows for tracing of any interaction, the collection of that information associated with that interaction and the transmission of that information to a given destination and the generation of reports. Using the alert feature of the invention, a teller at a window in a bank may be warned that the name of the person attempting to open a new account, or that the account being accessed, is listed in a database of known bad actors.

Having described the invention in detail, those skilled in the art will appreciate that, given the present disclosure, modifications may be made to the invention without departing from the spirit of the inventive concept herein described. Therefore, it is not intended that the scope of the invention be limited to the specific and preferred embodiments illustrated and described.

The invention claimed is:

1. An aggregator for disparate services and channels to allow secure transactions requiring authentication and/or authorization of a user with regard to a service or channel destination requested by a user wherein the user and destination are associated with one or more than one network comprising:

a connection of the user from a portal through which the user communicates a message containing a request to initiate a transaction at a service or channel destination in which an authorization or an authentication indicia is required, wherein access to the destination is determined by predetermined criteria associated with the request and the request comprises information concerning the user, the service or channel destination, and the network on which the user and the service or channel destination reside;

a service or channel destination comprising a predetermined activity in a network, device or system;

a transmission channel for transmitting the message from the portal to a switch, the switch determining a session key associated with the user and the user's relationship with the destination, the switch establishing a cache associated with the message, the cache preserving the

TABLE 1

| NUMBER OF SYSTEMS N | NUMBER OF INTERFACES REQUIRED IN A POINT TO POINT SYSTEM X = Sum (N-1) | NUMBER OF INTERFACES REQUIRED USING THE SYSTEM OF THE X = N | INTERFACE SAVINGS ACHEIVED WITH THE NORMALIZED SYSTEM |
|---|---|---|---|
| 4 | 6 | 4 | 2 |
| 6 | 15 | 6 | 9 |
| 10 | 45 | 10 | 35 |
| 20 | 190 | 20 | 170 |

The number of interfaces via the traditional point to point approach grows significantly as the environment grows. In the system described, the interfaces are reduced, providing advantages in maintenance of the environment as well as the cost of implementing changes. The benefits are available with a normalized approach in which adapters enable the system in existing environments.

The present invention also lends itself to nonfinancial applications. Using the system of the invention, a particular user's identification information may be compared to any given information, such as that included in a "hot file," for session key, the session key comprising either an existing session key or a new session key generated in conjunction with the message;

an adapter intermediate the user portal and the destination wherein the adapter communicates a message containing a request to initiate a transaction at a service or channel destination and translates messages between and among the portal and the destination through a channel, device, system, destination or processor in a format common to the user, destination, channel, device, system, destination or processor;

the switch comprising a processor interconnected with 1) means for communicating with the user, the service or channel destination, and one or more than one network, device, or system associated with the user and the service or channel destination, and 2) a security service for verifying the user pursuant to a comparison of information contained in the user message to preexisting data associated with the user, the request and the portal associated with the user's request, and an index of services and/or channels, devices or networks, in which comparison, 1) if verification does not occur, the user's request is denied, and 2) if verification occurs, a credential is created and transferred to the session cache wherein a new session key is created and maintained in the cache and the transaction associated with the user's request is approved to be accomplished at the destination associated with the request; and a signal message is transmitted over the network transmission channel to either or both of the user and the destination representing an indicia of a determination whether verification has occurred.

2. The system of claim 1 wherein the authorization or an authentication indicia is selected from the group consisting of a user ID, an ATM, a readable card, a certificate, a smart card, a magnetic stripe card, a biometric indicia, a password, a PIN, and a digital object security device.

3. The system of claim 1 in which the request is transmitted to a filter to determine whether the identity or authority of the user is listed in an index of identities or authorities known to be bad.

4. The system of claim 1 wherein the message is transmitted over a transmission channel that is either wired and wireless.

5. The system of claim 1 wherein the network transmission channel is the Internet.

6. The system of claim 1 wherein the channel is selected from the group consisting of a card reader, an ATM, a personal telephone, a voice unit, a VRU, a pager, a television, a PDA, a PC, a vending machine, a lock box processing, a business or government computer system and network, and wherein the user is selected from the group consisting of an entity, an individual, or a party acting on behalf of an entity or individual.

7. A secure language independent integrator of related or unrelated services and channels that require one or more authorization and authentication indicia in one or more than one network comprising:
   a connection of the user to a network from a portal through which the user communicates a formatted message containing a request to initiate a transaction at a destination in which an authorization or an authentication indicia is required and where access to the destination is determined by predetermined criteria associated with the request;
   one or more than one adapter connected to the network, the adapter 1) translating the format of a message from the portal into a format recognizable by a destination that provides a plurality of services in one or more than one network, 2) creating a session key and 3) creating a cache associated with the message and the session key created by the adapter;
   a processor interconnected with the adapter and the network for verifying the user with respect to predetermined information associated with the user in a data store in accordance with a multidimensional decision determined from information in the message and preexisting data associated with an index of services and channels, whereby upon verification, a new session key is created and the key created is transferred to the destination associated with the request; and
   a transmission channel for transmitting a signal message to the user and the destination representing an indicia comprising a determination of the authorization and authentication result associated with the request to either or both of the user and the destination dependent upon the verification whereupon, upon a positive result, the user's request to the destination is fulfilled.

8. The system of claim 7 wherein the user is a purchaser at a network or physical location of a merchant site and the request includes a query seeking the confirmation of the status of a current financial account associated with the purchaser.

9. The system of claim 7 wherein the signal message to the user and the destination includes an alert representing an indicia comprising the alert is an informational update, a fraud alert, a loyalty point, and a coupon.

10. The system of claim 7 wherein information contained in the message about the user is compared to information contained in a database of known terrorists.

11. The system of claim 7 wherein the switch creates and executes a determinate upon receipt of a request from a user.

12. The system of claim 11 wherein the determinate is based upon information selected from the group consisting of the channel, the request, the user, the services provided from the channel, an owner of the channel, the family of service providers associated with the channel, a credential presented, the network format language, the interface between the user and destination, and the destination.

13. The system of 7 wherein the adapter translates and standardizes elements of communication between the user and the destination in accordance with a semantic, a data format, a transport, and a wire protocol of an input signal.

14. The system of claim 13 wherein data management routines in the adapter support Federal Data Encryption Standards (DES).

15. The system of claim 13 wherein data management routines in the adapter support crypt password encryption.

16. The system of claim 13 wherein the standardized element of the adapter is a semantic IFX.

* * * * *